(12) United States Patent
Okada

(10) Patent No.: US 7,389,126 B2
(45) Date of Patent: Jun. 17, 2008

(54) CELLULAR PHONE WHICH ADDS EXCHANGE HEADER ACCESSING INFORMATION BASED UPON COUNTRY NUMBER STORED IN AN IC AND POSITION INFORMATION

(75) Inventor: Kazuo Okada, Koto-ku (JP)

(73) Assignee: Aruze Corporation, Tokyo (JP)

( * ) Notice: Subject to any disclaimer, the term of this patent is extended or adjusted under 35 U.S.C. 154(b) by 582 days.

(21) Appl. No.: 11/022,678

(22) Filed: Dec. 28, 2004

(65) Prior Publication Data
US 2005/0148366 A1 Jul. 7, 2005

(30) Foreign Application Priority Data
Jan. 7, 2004 (JP) ............................. 2004-001944

(51) Int. Cl.
*H04M 1/00* (2006.01)
(52) U.S. Cl. ................... 455/558; 455/557; 455/435.1; 455/412.1; 379/433.09; 379/114.15
(58) Field of Classification Search ................ 455/558, 455/557, 412.1, 415, 424, 425, 435.1, 456.5, 455/456.6, 561, 432.1, 456.1, 404.2, 348, 455/418, 552.1, 550.1, 575.1, 564; 379/266, 379/355, 356, 357, 419, 440
See application file for complete search history.

(56) References Cited

U.S. PATENT DOCUMENTS

| 5,275,400 | A | | 1/1994 | Weingardt et al. |
| 5,710,884 | A | * | 1/1998 | Dedrick ....................... 709/217 |
| 6,210,275 | B1 | | 4/2001 | Olsen |
| 6,295,458 | B1 | * | 9/2001 | Takahashi ................... 455/466 |
| 6,941,159 | B2 | * | 9/2005 | Tsai et al. .................... 455/564 |
| 7,062,299 | B2 | * | 6/2006 | Choi ........................... 455/566 |
| 7,120,469 | B1 | * | 10/2006 | Urakawa ..................... 455/564 |
| 2001/0034244 | A1 | * | 10/2001 | Calder et al. ............... 455/556 |
| 2002/0103009 | A1 | * | 8/2002 | Sato ........................... 455/558 |
| 2002/0177483 | A1 | | 11/2002 | Cannon |
| 2003/0040280 | A1 | * | 2/2003 | Koskelainen .............. 455/67.1 |
| 2003/0054860 | A1 | * | 3/2003 | Chen .......................... 455/558 |

(Continued)

FOREIGN PATENT DOCUMENTS

JP 3071509 6/2000

(Continued)

*Primary Examiner*—Edward F. Urban
*Assistant Examiner*—Charles Chow
(74) *Attorney, Agent, or Firm*—Oliff & Berridge, PLC

(57) ABSTRACT

The present invention provides cellular phone in which a plurality of mounting parts for IC cards in which the country number of the contracting country and the own-station telephone number are stored are disposed, the cellular phone comprising position information storage means that store position of the cellular phone, selection means which make it possible to select the IC card in which the own-station telephone number that is used for calling is stored, first determination means which determine, on the basis of the country number stored in the selected IC card and the stored position information, whether or not calling is to be performed by adding header information for accessing the exchange of the contracting country of the IC card, and calling means which perform calling by adding the header information in cases where the first determination means determine that calling is to be performed by adding the header information.

13 Claims, 5 Drawing Sheets

U.S. PATENT DOCUMENTS

| | | | |
|---|---|---|---|
| 2003/0144046 A1 | 7/2003 | Hara | |
| 2005/0054286 A1* | 3/2005 | Kanjilal et al. | 455/3.05 |
| 2005/0164737 A1* | 7/2005 | Brown | 455/558 |
| 2006/0100932 A1* | 5/2006 | Ohmori et al. | 705/21 |
| 2007/0082705 A1* | 4/2007 | Jain et al. | 455/558 |
| 2007/0186107 A1* | 8/2007 | Sonetaka | 713/170 |
| 2007/0189055 A1* | 8/2007 | Okuda | 365/114 |
| 2007/0211870 A1* | 9/2007 | De Beer | 379/121.01 |

FOREIGN PATENT DOCUMENTS

| | | |
|---|---|---|
| JP | 2000-349871 | 12/2000 |
| JP | 2002-095038 | 3/2002 |
| JP | 2002-111810 | 4/2002 |
| JP | 2002-199100 | 7/2002 |
| JP | 2002-218536 | 8/2002 |
| JP | 2003-189013 | 7/2003 |
| JP | 2003-244290 | 8/2003 |
| WO | WO 92/19078 | 10/1992 |
| WO | WO 94/08433 | 4/1994 |
| WO | WO 94/28686 | 12/1994 |
| WO | WO 96/11557 | 4/1996 |
| WO | WO 98/51384 | 11/1998 |
| WO | WO 01/41035 A1 | 6/2001 |
| WO | WO 03/013173 A1 | 2/2003 |

\* cited by examiner

FIG.3

| OWN-STATION TELEPHONE NUMBER | NAME | CORRESPONDENT-STATION TELEPHONE NUMBER | COUNTRY NUMBER |
|---|---|---|---|
| X | TANAKA | A | L |
| | SAITOH | B | M |
| Y | SUZUKI | C | N |
| | TAKAHASHI | D | L |
| Z | YAMADA | E | L |
| | SATOH | F | N |

CELLULAR PHONE WHICH ADDS EXCHANGE HEADER ACCESSING INFORMATION BASED UPON COUNTRY NUMBER STORED IN AN IC AND POSITION INFORMATION

RELATED APPLICATIONS

This application claims the priority of Japanese Patent Application No. 2004-001944 filed on Jan. 7, 2004, which is incorporated herein by reference.

BACKGROUND OF THE INVENTION

1. Field of the Invention

The present invention relates to a cellular phone which can mount an IC card such as (for example) an SIM (subscriber identity module) card or the like, and a control method for this cellular phone.

2. Description of the Prior Art

In the GSM (global system for mobile communication) that has been standardized in Europe, an IC card called an SIM card (hereafter referred to simply as an "SIM card") is essential. Information such as authentication algorithms, telephone numbers and the like required for calling and receiving calls is contained in this SIM card, and calling and the receiving of calls that are the intrinsic functions of a telephone can be performed by a GSM standard cellular phone by inserting this card into such a cellular phone. Specifically, in a state in which this card is not inserted, the standard is a standard that does not allow calling or the receiving of calls by the cellular phone. This concept is also continued in the IMT-2000 standard, which is called the next generation of cellular phones, and standardization as USIM (user subscriber identity module) is in progress.

MF (master files), DF (dedicated files), ADF (application dedicated files) and EF (elementary files) are contained in USIM cards as determined by the IMT-2000 standard. Information relating to authentication algorithms and telephone numbers that are required for calling and receiving calls as in the case of GSM SIM cards, and also various types of information such as telephone books and the like that are supported for the first time in USIM cards, are contained in the form of files. Information relating to the telephone numbers of the respective USIM cards is contained in a file called EF_IMSI, which is one type of the abovementioned EF, and this information is supplied to the network side.

Thus, the EF_IMSI contains information relating to telephone numbers; this information consists of country number+carrier number+serial number. This country number and carrier number indicate a certain carrier number of a certain country contracting the USIM card. The telephone number of the cellular phone that is used by inserting the USIM card corresponds to this EF_IMSI. Specifically, in cases where the country number of the EF_IMSI is (81), the telephone number of the cellular phone that is used by inserting the USIM card is the country number (81)+own-station telephone number.

In a case where a cellular phone A (containing the telephone number <81+090-0123-4567> in a USIM-A card) and a cellular phone B (containing the telephone number <81+090-8901-2345> in a USIM-B card) in which USIM cards contracted in Japan are inserted are taken to the Republic of Korea and are used to communicate with each other in the Republic of Korea, even if it is known that both cellular phones are present in the Republic of Korea, it is necessary to call by dialing the country number+own-station telephone number of the cellular phone B (81+090-8901-2345) when the cellular phone B is called from the cellular phone A.

In this case, the home location register of Japan, which is the contracting country of the USIM-B card, is first accessed. Next, processing that makes a connection with the terminal B from this home location register by international roaming is performed, so that international telephone charges must always be paid. Thus, the communications charges are not determined only by the positional relationship of the calling party and called party; besides this positional relationship, the charges also depend on the country numbers of the USIM cards possessed by the calling party and called party. In some cases, therefore, it is more convenient to insert and use a plurality of USIM cards with different country numbers.

Cellular phones equipped with a plurality of mounting parts that allow the mounting of SIM cards have conventionally been known (for example, see Japanese Utility Model Registration No. 3071509, Japanese Unexamined Patent Publication No. 2002-95038 and Japanese Unexamined Patent Publication No. 2003-244290). In the cellular phones described in three documents mentioned above, calling and the receiving of calls can be performed using a plurality of own-station telephone numbers in a single unit; accordingly, these cellular phones are superior in terms of convenience.

Furthermore, there are also cellular phones which are equipped with position information acquisition means, and in which an SIM card storing a telephone number used for calling is automatically selected from a plurality of SIM cards in accordance with position information that is acquired by these position information acquisition means (for example, see Japanese Unexamined Patent Publication No. 2002-218536). In the cellular phone described in Japanese Unexamined Patent Publication No. 2002-218536, since the SIM card storing the telephone number used for calling is automatically selected in accordance with position information so that the communications charges are lowered, the work of selecting the SIM card can be omitted, this cellular phone is superior in terms of convenience.

Meanwhile, in Japan, the spread of cellular phones has been conspicuous in recent years, and it is not unusual to find cases in which persons engaged in the bars or night clubs, or persons such as businessmen, managers, directors or the like who are provided with cellular phones by their employers, have a plurality of cellular phones used for private and public business. Furthermore, other causes of an increase in the number of cellular phones owned by a single individual include the possession of cellular phones contracted overseas in addition to cellular phones contracted in Japan by persons who work as directors in more than one country, persons who frequently make overseas business trips and the like. Because of the requirements of globalization, domestic cellular phone carriers are marketing cellular phones that can be used in more than one country (in cooperation with cellular phone firms in various countries); however, since these cellular phones have only one usable own-station telephone number, there is no change in the current situation requiring the possession of a plurality of cellular phones by persons using these cellular phones for private or public purposes, or using such cellular phone with the own-station telephone number varied according to the correspondent involved.

However, depending on the situation of the user or the like, there may be cases in which the user does not wish the correspondent to know that a plurality of SIM cards are being used. For example, if calling using the USIM-B card is automatically performed in the case of a correspondent with whom the user ordinarily communicates using the USIM-A card, this correspondent will learn the telephone number of the USIM-B card. As a result, there is some concern that it may be difficult to ensure a reliable division of use according to telephone numbers. Furthermore, there is also a danger that this will lead to a deterioration in personal relationships.

If telephone calls are made using a certain SIM card for the reason that charges are reduced due to the fact that the contracting country of this SIM card coincides with the country in which the cellular phone is used, the following problem in terms of cellular phone charges arises: namely, communications charges for private use and public use may become mixed together. Furthermore, the following problem may also be encountered: namely, even in cases where a certain cellular phone is a cellular phone used for private purposes, there may be users who wish to separate the use of an own-station telephone number used for recreational purposes and an own-station telephone number used for family purposes. As a result of such problems, users who wish to separate the use of a plurality of own-station telephone numbers encounter the following problem: namely, it is not sufficient that the communications charges be inexpensive; it is also necessary to take into account the abovementioned problems encountered in communications expenses, and the problem of the own-station telephone number becoming known to the correspondent.

SUMMARY OF THE INVENTION

The present invention is devised in light of the abovementioned problems. It is an object of the present invention to provide a cellular phone which makes it possible to prevent the fact that a plurality of IC cards are being used from becoming known to correspondents, and which also makes it possible to achieve a secure separation of use according to telephone numbers, and to prevent mixing of communications charges and a deterioration in personal relationships.

In order to solve the abovementioned problems, the present invention provides the following:

(1) A cellular phone comprising:
  a plurality of mounting parts for mounting of IC cards in which at least the country number of the contracting country and the own-station telephone number are stored;
  position information storage means for storing position information indicating the position where the abovementioned cellular phone is located;
  selection means for making it possible to select the IC card in which the own-station telephone number that is used for calling is stored from the IC cards mounted in each of the abovementioned plurality of mounting parts;
  first determination means for determining, on the basis of the country number stored in the IC card selected by the abovementioned selection means and the position information stored in the abovementioned position information storage means, whether or not calling is to be performed by adding header information for accessing the exchange of the contracting country of the abovementioned IC card; and
  calling means for performing calling by adding the abovementioned header information in cases where the abovementioned first determination means determine that calling is to be performed by adding the abovementioned header information.

Furthermore, the present invention provides the following:

(2) The cellular phone according to the abovementioned (1), comprising:
  telephone number storage means for storing the correspondent-station telephone number and country number in correspondence with the own-station telephone number stored in one of the IC cards mounted in each of the abovementioned plurality of mounting parts;
  second determination means for determining whether or not the own-station telephone number corresponding to the correspondent-station telephone number stored in the abovementioned telephone number storage means and the own-station telephone number stored in the IC card selected by the above-mentioned selection means are the same; and
  first notification image display means for receiving an indication that the abovementioned second determination means have determined that the own-station telephone number corresponding to the correspondent-station telephone number stored in the telephone number storage means and the own-station telephone number stored in the IC card selected by the selection means are not the same, and displaying a first notification image that provides notification of the determination result.

Furthermore, in the cellular phone according to the present invention, a telephone book data including the names of correspondents, correspondent-station telephone numbers and country numbers may be stored in the telephone number storage means.

Furthermore, the cellular phone according to the present invention may be constructed so that the telephone book data is stored in the IC cards, and the telephone book data stored in the IC cards is stored in the telephone number storage means in correspondence with the own-station telephone numbers of the IC cards when the IC cards are mounted in the cellular phone.

Furthermore, the cellular phone according to the present invention may be constructed so that when the IC cards are removed from the cellular phone, the telephone book data stored in the telephone number storage means is reset.

Furthermore, the present invention provides the following:

(3) The cellular phone according to the abovementioned (2), comprising:
  third determination means for determining whether or not an IC card in which an own-station telephone number corresponding to the correspondent-station telephone number stored in the abovementioned telephone number storage means has been mounted in one of the abovementioned plurality of mounting parts; and
  second notification image display means for receiving an indication that the abovementioned third determination means have determined that an IC card in which an own-station telephone number corresponding to the correspondent-station telephone number stored in the abovementioned telephone number storage means has not been mounted in any of the abovementioned plurality of mounting parts, and displaying a second notification image that provides notification of the determination result.

Furthermore, the present invention also provides the following:

(4) The cellular phone according to the abovementioned (2) or (3), comprising confirmation image display means for receiving an indication that there has been the input of an instruction to perform calling using an own-station telephone number that differs from the own-station telephone number corresponding to the correspondent-station telephone number stored in the above-mentioned telephone number storage means, and displaying a non-notification confirmation image that allows the input of instructions as to whether or not calling is to be performed without notification.

Furthermore, in the cellular phone according to the present invention, the IC cards may be SIM (subscriber identity module) cards.

Furthermore, the present invention also provides the following:

(5) A cellular phone control method, in which the cellular phone is provided with a plurality of mounting parts that allow the mounting of IC cards in which at least the country number of the contracting country and the own-station telephone number are stored, this cellular phone comprising position information storage means for storing position information indicating the position where the abovementioned cellular phone is located, and selection means for making it possible to select the IC card in which the own-station telephone number that is used for calling is stored from the IC cards mounted in each of the above-mentioned plurality of mounting parts, wherein the method comprises:

a first determination step in which a determination is made on the basis of the country number stored in the IC card selected by the above-mentioned selection means and the position information stored in the above-mentioned position information storage means as to whether or not calling is to be performed by adding header information for accessing the exchange of the contracting country of the abovementioned IC card; and a calling step in which calling is performed by adding the abovementioned header information in cases where it is determined in the abovementioned first determination step that calling is to be performed by adding the abovementioned header information.

Furthermore, the present invention also provides the following:

(6) The cellular phone control method according to the above-mentioned (5), wherein the abovementioned cellular phone comprises telephone number storage means for storing correspondent-station telephone numbers and country numbers in correspondence with the own-station telephone number stored in one of the IC cards mounted in each of the abovementioned plurality of mounting parts, and the above-mentioned method comprises:

a second determination step in which a determination is made as to whether or not the own-station telephone number corresponding to the correspondent-station telephone number stored in the abovementioned telephone number storage means and the own-station telephone number stored in the IC card selected by the abovementioned selection means are the same; and a first notification image display step in which an indication that it has been determined in the abovementioned second determination step that the own-station telephone number corresponding to the correspondent-station telephone number stored in the abovementioned telephone number storage means and the own-station telephone number stored in the IC card selected by the above-mentioned selection means are not the same is received, and a first notification image that provides notification of the determination result is displayed.

Furthermore, the present invention also provides the following:

(7) The cellular phone control method according to the above-mentioned (6), comprising:

a third determination step in which a determination is made as to whether or not an IC card in which an own-station telephone number corresponding to the correspondent-station telephone number stored in the above-mentioned telephone number storage means is mounted in one of the abovementioned plurality of mounting parts; and a second notification image display step in which an indication that it has been determined in the above-mentioned third determination step that an IC card in which an own-station telephone number corresponding to the correspondent-station telephone number stored in the abovementioned telephone number storage means is not mounted in any of the abovementioned plurality of mounting parts is received, and a second notification image that provides notification of the determination result is displayed.

BRIEF DESCRIPTION OF THE DRAWINGS

FIG. 3 is a diagram which shows one example of telephone book data stored in a telephone number storage circuit disposed in the cellular phone shown in FIG. 1;

FIGS. 5A to 5E are views which show examples of the image that are displayed by the display of the cellular phone shown in FIG. 1.

DESCRIPTION OF THE PREFERRED EMBODIMENTS

Embodiments of the present invention will be described with reference to the attached figures. A cellular phone which allows the mounting of two SIM cards in a single unit will be described below. Of course, there are no particular restrictions on the number of IC cards that can be mounted in a single unit in the cellular phone of the present invention, as long as this number is a plural number.

Figure 1A:
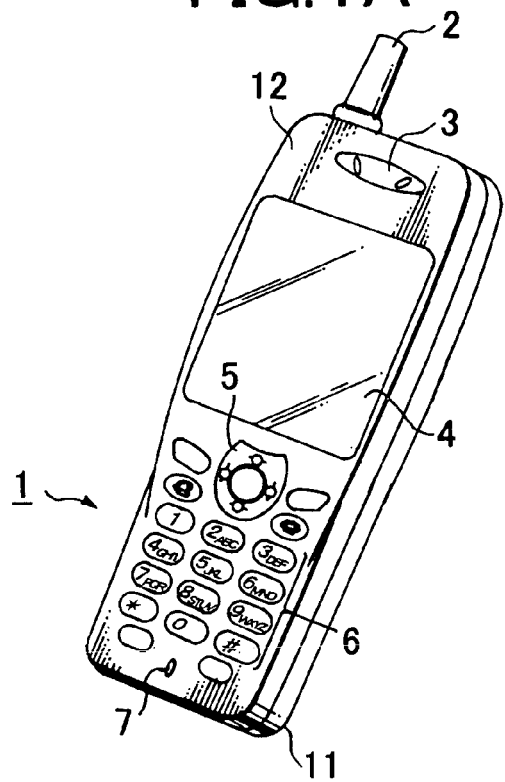
FIGS. 1A and 1B are perspective views which schematically show one example of the cellular phone of the present invention.
Figure 1B:
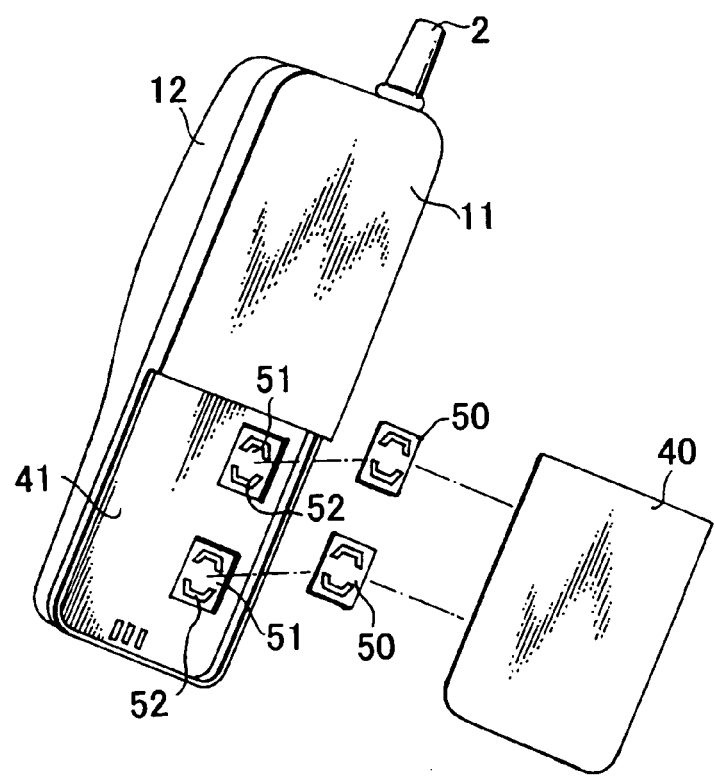

FIGS. 1A and 1B are perspective views which schematically show one example of the cellular phone of the present invention.

The cellular phone 1 comprises an antenna 2 which is used to input and output a carrier from and to a base station, a receiver opening 3 which is used to hear the voice of the correspondent station (calling correspondent) when on the telephone, a display 4 which is used for the setting of various functions and the display of the telephone numbers (correspondent-station telephone numbers), names and the like of correspondents, a cruciform direction operating key 5 which is used to adjust the volume of received calls or calling volume, to display the content of memory dialing in a specified state on the display 4, and to select the settings of various functions, an operating key group 6 including dial keys which are used to input telephone numbers, characters and the like, and a transmitter opening 7 which is used to transmit the voice of one's own station during communications.

The outer covering of the cellular phone 1 is divided into a case 11 which is used to accommodate specified internal parts (including electronic parts), and a cover 12 that covers the internal parts accommodated in the case 11. This outer covering is constructed by engaging both the case 11 and cover 12 in a state in which the internal parts are accommodated inside the case 11.

Furthermore, a battery groove 41 is formed in the back side of the cellular phone 1, and a battery pack 40 is accommodated in this battery groove 41.

Furthermore, two engaging grooves 51 constituting the above-mentioned mounting parts that are used to engage SIM cards 50 are disposed in the battery groove 41. A contact part 52 is formed in each of these two engaging grooves 51, and these parts are constructed so that the metal contacts of the SIM cards 50 that are engaged in these engaging grooves 51 contact these contact parts 52. Two SIM cards 50 can be mounted in this cellular phone 1, so that two own-station telephone numbers can be used.

The antenna 2 is clamped between the case 11 and cover 12, and the tip end portion of this antenna protrudes forward from the left side of the front end of the cellular phone 1. The receiver opening 3 is formed in the upper portion of the cover 12, which the transmitter opening 7 is formed in the lower portion of the cover 12. The display surface of the display 4 is exposed on the cover 12 in a position beneath the receiver opening 3, and the operating surface of the operating key group 6 is exposed on the cover 12 in a position beneath the transmitter opening 7.

The cruciform direction operating key 5 is disposed in the central portion of the cellular phone 1 in the lateral direction between the display 4 and operating key group 6 so that operation by the thumb is facilitated when the cellular phone 1 is grasped in order to perform communications.

The SIM card 50 storing the own-station telephone number that is to be used in calling can be selected (from the two SIM cards 50 present) by operating the cruciform direction operating key 5 and operating key group 6. This cruciform direction operating key 5 and operating key group 6 function as the above-mentioned selection means (selection device).

Figure 2:
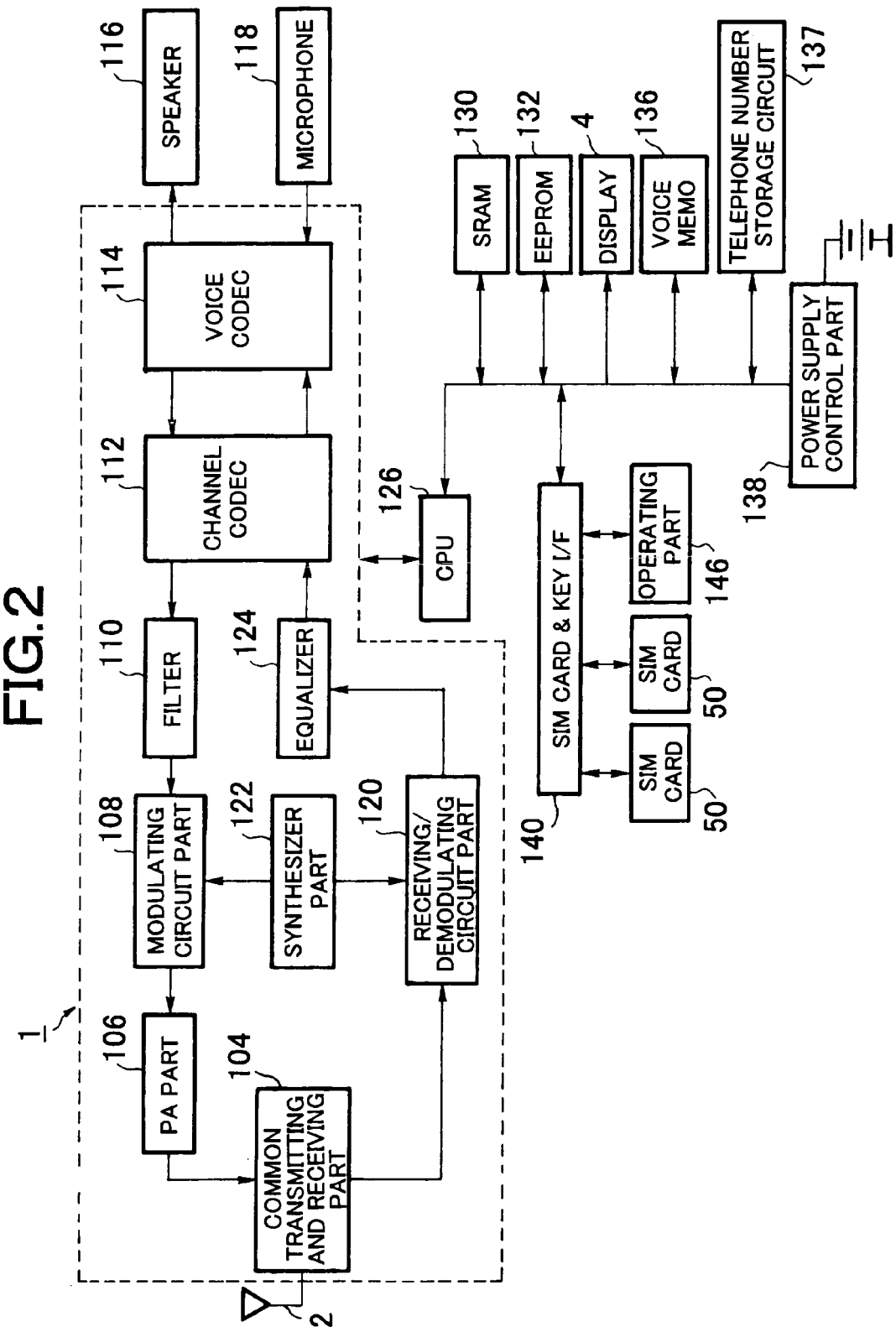
FIG. 2 is a block diagram which shows the internal construction of the cellular phone shown in FIG. 1.

FIG. 2 is a block diagram which shows the internal construction of the cellular phone shown in FIG. 1.

The cellular phone 1 is constructed from an antenna 2, a common transmitting and receiving part 104, a PA part 106, a modulating circuit part 108, a filter 110, a channel CODEC 112, a voice CODEC 114, a speaker 116, a microphone 118, a receiving/demodulating circuit part 120, a synthesizer part 122, an equalizer 124, a CPU 126, an SRAM 130, an EEPROM 132, a display 4, a voice memo 136, a telephone number storage circuit 137, a power supply control part 138, an SIM card & key I/F 140, two SIM cards 50 and an operating part 146.

The antenna 2 is connected to the common transmitting and receiving part 104, and has the function of a transmitting and receiving antenna with a favorable antenna radiation efficiency in the frequency band of the mobile communications system used. The common transmitting and receiving part 104 is connected to the PA parts 106 and receiving/demodulating circuit part 120, and has the function of a common transmitter-receiver. The PA part 106 is connected to the common transmitting and receiving part 104 and modulating circuit part 108, and has the function of a power amplifier that is used to amplify the transmission wave.

The modulating circuit part 108 is connected to the PA part 106 and filter part 110, and has the function of a signal modulating circuit. The filter 110 is connected to the modulating circuit part 108 and channel CODEC 112, and has the function of a signal filter corresponding to the mobile communications system used. The channel CODEC 112 is connected to the filter 110 and voice CODEC 114, and has a channel CODEC function. The voice CODEC 114 is connected to the speaker 116, microphone 118 and channel CODEC 112, and has the function of a voice encoding CODEC corresponding to the mobile communications network used. The speaker 116 is connected to the voice CODEC 114, and has the function of causing voice output of voice information. The microphone 118 is connected to the voice CODEC 114, and has the function of inputting voice information.

The receiving/demodulating circuit part 120 is connected to the common transmitting and receiving part 104, the synthesizer part 122 and the equalizer 124, and has the function of a circuit that receives and demodulates signals. The synthesizer part 122 is connected to the receiving/demodulating circuit part 120 and modulating circuit part 108, and has the function of a signal synthesizing circuit. The equalizer 124 is connected to the receiving/demodulating circuit part 120 and channel CODEC 112, and can divide the audio information by band, and emphasize specified sounds; this part has the function of emphasizing high and low tones in accordance with the voice of the correspondent, so that this voice is adjusted to a voice that is easy to hear. The CPU 126 has the function of providing comprehensive control of the respective blocks of the cellular phone 1. The SRAM 130 has a memory function that is used in the processing of programs. The EEPROM 132 has a memory function for electronic volume information and the like. The display 4 has a liquid crystal display function. The voice memo 136 has a memory function used for voice accumulation.

The power supply control part 138 has the function of supplying power to respective blocks, and controlling charging. The SIM card & key interface I/F 140 is connected to the two SIM cards 50 and the operating part 146, and has the function of an interface between the two SIM cards 50 and the key operating part 146. At least the country number of the contracting country and the own-station telephone number are stored in each of the SIM cards 50. The operating part 146 consists of the cruciform direction operating key 5 and operating key group 6 shown in FIG. 1.

Furthermore, a telephone number storage circuit 137 constituting the abovementioned telephone number storage means (telephone number storage device) is connected to the CPU 126. Telephone book data including a plurality of correspondent-station telephone numbers and country numbers is stored in this telephone number storage circuit 137. For example, the abovementioned telephone number storage means may be constructed from an SRAM, flash memory, hard disk drive or the like.

FIG. 3 is a diagram which shows one example of the telephone book data that is stored in the telephone number storage circuit 137.

As is shown in FIG. 3, a plurality of correspondent names, correspondent-station telephone numbers and country numbers are stored in the telephone number storage circuit 137 in respective correspondence with the own-station telephone number.

When calling is performed by selecting the name of a correspondent stored in this telephone number storage circuit 137, the country number is automatically added to the correspondent-station telephone number that is associated with the name of this correspondent. For example, in cases where a call is made to "Tanaka", the country number L is automatically added to the correspondent-station telephone number A associated with "Tanaka", and calling is performed by dialing L+A.

The user can input correspondent names, correspondent-station telephone numbers, country numbers and own-station telephone numbers by operating the cruciform direction operating key 5 and operating key group 6, and can cause such data to be stored in the telephone number storage circuit 137, or can erase correspondent names, correspondent-station telephone numbers, country numbers and own-station telephone numbers that have been stored. Furthermore, the system may also be devised so that country numbers and/or own-station telephone numbers can be selected from selection branches provided in advance by operating the cruciform direction operating key 5.

Furthermore, position information for the cellular phone 1 is stored in the abovementioned memory that is connected to the CPU 126. The user can store the abovementioned position information in the abovementioned memory by inputting the name of the country where the cellular phone 1 is located or the like through the operation of the cruciform direction operating key 5 or operating key group 6. Furthermore, the cellular phone 1 may also be constructed so that the abovementioned position information is stored in the abovementioned memory by selecting the name of the country where the cellular phone 1 is located from selection branches for country names prepared in advance by the user, through the operation of the cruciform direction operating key 5.

Furthermore, it would also be possible to receive notification signals that are transmitted from an exchange in the country where the user is residing, and to store position information contained in these notification signals in the abovementioned memory; moreover, it would also be possible to install a GPS (global positioning system) receiver in the cellular phone 1, to acquire position information by receiving electromagnetic waves from a plurality of satellites, and to store this information.

Furthermore, the external appearance and internal construction of the cellular phone of the present invention are naturally not limited to the examples shown in FIGS. 1 and 2.

Figure 4:
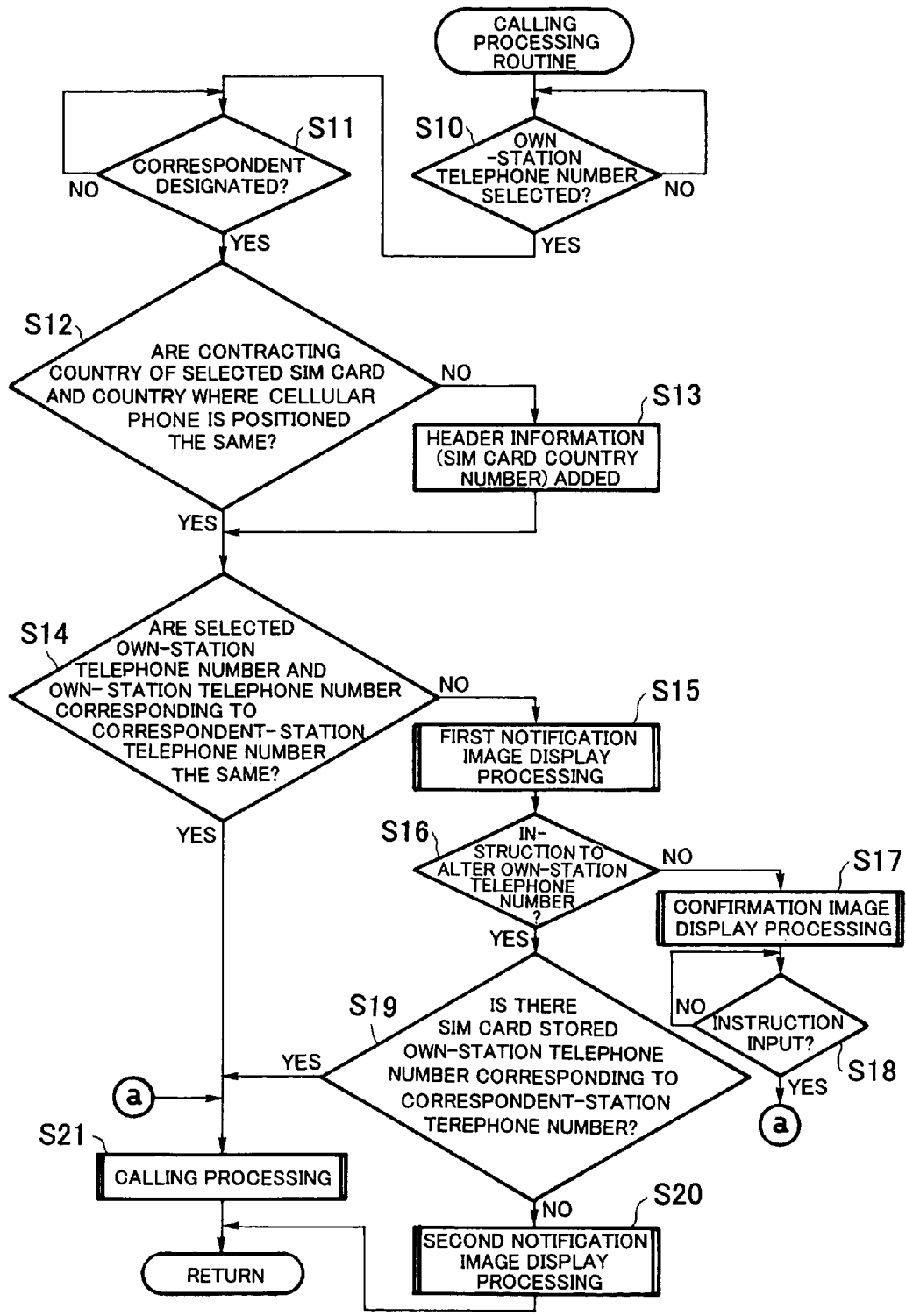
FIG. 4 is a flow chart which shows the calling processing routine that is executed in the control circuit of the cellular phone shown in FIG. 1.

FIG. 4 is a flow chart which shows the calling processing routine that is executed in the CPU 126 of the cellular phone 1 shown in FIG. 1. This subroutine is a subroutine that is called up and executed at a specified timing from a main routine that is executed beforehand.

First, the CPU 126 determines whether or not there has been an instruction to select an own-station telephone number (step S10). In step S10, the CPU 126 determines whether or not an instruction to select an own-station telephone number for performing calling has been input by the operation of the cruciform direction operating key 5 or operating key group 6.

In cases where it is determined in step S10 that there has been no instruction to select an own-station telephone number, the CPU 126 returns the processing to step S10.

On the other hand, in cases where it is determined in step S10 that there has been an instruction to select an own-station telephone number, the CPU 126 next determines whether or not there has been a designation of the correspondent to be called (step S11). In step S11, the CPU 126 determines whether or not an instruction to select one correspondent-station telephone number from the plurality of correspondent-station telephone numbers stored in the telephone number storage means 137 has been input by the operation of the cruciform direction operating key 5 or operating key group 6.

In cases where it is determined in step S11 that there has been no designation of a correspondent, the CPU 126 returns the processing to step S11.

On the other hand, in cases where it is determined in step S11 that a correspondent has been designated, the CPU 126 next determines whether or not the contracting country of the selected SIM card and the country in which the cellular phone is located are the same (step S12). In this step S12, the CPU 126 determines whether or not the contracting country of the SIM card 50 and the country where the cellular phone 1 is positioned are the same on the basis of the country number of the SIM card 50 associated with the own-station telephone number selected in the abovementioned step S10 and the position information stored in the above-mentioned memory.

When the processing of step S12 is executed, the CPU 126 functions as the abovementioned first determination means (first determination device).

In cases where it is determined in step S12 that the contracting country of the selected SIM card and the country where the cellular phone is positioned are different, the CPU 127 next performs processing that adds header information (step S13). In this step S13, processing is executed in which the country number of the SIM card 50 associated with the own-station telephone number selected in step S10 is added as the abovementioned header information to the own-station telephone number contained in the signal that is transmitted when calling is performed in step S21 described below.

When the processing of this step S13 is executed, the country number of the SIM card 50 associated with the own-station telephone number that is transmitted when calling is performed in step S21 is added to this own-station telephone number.

When the processing of step S13 is executed, or in cases where it is determined that the contracting country of the SIM card selected in step S12 and the country where the cellular phone is positioned are the same, the CPU 126 next determines whether or not the own-station telephone number selected in step S10 and the own-station telephone number corresponding to the correspondent-station telephone number selected in step S11 are the same (step S14). In step S14, the CPU 126 determines whether or not the own-station telephone number for which a selection instruction is input in step S10 and the own-station telephone number corresponding to the correspondent-station telephone number selected in step S11 are the same by referring to the telephone book data stored in the telephone number storage circuit 137.

When the processing of this step S14 is executed, the CPU 126 functions as second determination means (second determination device).

In cases where it is determined in step S14 that the own-station telephone number selected in step S10 and the own-station telephone number corresponding to the correspondent-station telephone number selected in step S11 are the same, the CPU 126 executes processing that performs calling using this own-station telephone number (step S21), and this subroutine is ended.

On the other hand, in cases where it is determined in step S14 that the own-station telephone number selected in step S10 and the own-station telephone number corresponding to the correspondent-station telephone number selected in step S11 are different, the CPU 126 next executes first notification image display processing (step S15). In this step S15, the CPU 126 executes processing that displays the abovementioned first notification image on the display 4; this first notification image being an image which provides notification that the own-station telephone number selected in step S10 and the own-station telephone number corresponding to the correspondent-station telephone number selected in step S11 are different, and which allows the input of instructions from the cruciform direction operating key 5 or operating key group 6 as to whether calling is to be performed using the own-station telephone number selected in step S10 or whether calling is to be performed using the own-station telephone number corresponding to the correspondent-station telephone number selected in step S11.

When the processing of this step S15 is executed, the CPU 126 and display 4 function as first notification image display means (first notification image display device). Furthermore, this first notification image will be described in detail later with reference to the figures (FIG. 5).

When the processing of step S15 is executed, the CPU 126 next determines whether or not there is an instruction to alter the own-station telephone number used for calling when the abovementioned first notification image is displayed on the display 4 (step S16).

In cases where it is determined in step S16 that there is no instruction to alter the own-station telephone number, i.e., that there is instruction to perform calling using the own-station telephone number selected in step S10, the CPU 126 next executes confirmation image display processing (step S17). In this step S17, the CPU 126 executes processing that causes a non-notification confirmation image to be displayed on the display 4; this non-notification confirmation image being an image that allows the input of instructions by means of the cruciform direction operating key 5 or operating key group 6 as to whether or not calling is to be performed without notification in cases where calling is performed using an own-station telephone number that is selected by the processing of step S10, and that differs from the own-station telephone number corresponding to the correspondent-station telephone number stored in the telephone number storage circuit 137.

When the processing of this step S17 is executed, the CPU 126 and display 4 act as confirmation image display means (confirmation image display device). Furthermore, this non-notification confirmation image will be described in detail later with reference to the figures (FIG. 5).

When the processing of step S17 is executed, the CPU 126 next determines whether or not an instruction as to whether or not calling is to be performed without notification is input while the abovementioned non-notification confirmation image is displayed (step S18). In cases where it is determined in step S18 that no instruction is input, the CPU 126 returns the processing to step S18.

On the other hand, in cases where it is determined in step S18 that an instruction is input, the CPU 126 executes processing that performs calling with or without notification of the own-station telephone number selected in step S10 (step S21), and then ends this subroutine.

In cases where it is determined in the abovementioned step S16 that there is an instruction to alter the own-station telephone number, i.e., that there is an instruction to alter the own-station telephone number from the own-station telephone number selected in step S10 to the own-station telephone number corresponding to the correspondent-station telephone number, the CPU 126 next determines whether or not there is an SIM card in which this own-station telephone number corresponding to the correspondent-station telephone number is stored (step S19). In this step S19, the CPU 126 determines whether or not an SIM card 50 in which an own-station telephone number corresponding to the correspondent-station telephone number selected in step S11 is stored is mounted in either of the two engaging grooves 51.

When the processing of this step S19 is executed, the CPU 126 functions as the third determination means (third determination device).

In cases where it is determined in step S19 that there is an SIM card in which an own-station telephone number corresponding to the correspondent-station telephone number is stored, the CPU 126 executes processing that performs calling using this own-station telephone number (step S21), and then ends this subroutine.

On the other hand, in cases where it is determined in step S19 that there is no SIM card in which an own-station telephone number corresponding to the correspondent-station telephone number is stored, the CPU 126 next executes second notification image display processing (step S20). In this step S20, the CPU 126 executes processing that causes a second notification image to be displayed, this second notification image being an image which provides notification that no SIM card 50 storing an own-station telephone number corresponding to the correspondent-station telephone number selected in step S11 is mounted in either of the two engaging grooves 51.

When the processing of this step S20 is executed, the CPU 126 and display 4 function as second notification image display means (second notification image display device). This second notification image will be described in detail later with reference to the figures (FIG. 5).

When the processing of step S20 is executed, this subroutine is ended.

Furthermore, when the subroutine shown in FIG. 4 is executed, the CPU 126 functions as calling means (calling device).

As is described above, in cases where the contracting country of the SIM card 50 used to perform calling and the country in which the cellular phone 1 is positioned are different in step S12, calling is performed (step S21) with the country number of this SIM card 50 added to the own-station telephone number of the SIM card 50 as header information (step S13).

In this case, the signal that is transmitted from the cellular phone 1 is received by the exchange of the country in which the cellular phone 1 is positioned. When the exchange of the country in which the cellular phone 1 is positioned receives the abovementioned signal, the abovementioned signal is transferred to the exchange of the contracting country of the SIM card 50 on the basis of the abovementioned header information contained in the abovementioned signal. As a result, the exchange of the contracting country of the SIM card 50 is accessed. Furthermore, the exchange of the SIM card 50 accesses cellular phones or fixed telephones of correspondents on the basis of the correspondent-station telephone numbers and country number contained in the abovementioned signal.

On the other hand, in cases where the contracting country of the SIM card 50 used to perform calling and the country in which the cellular phone 1 is positioned are the same in step S12, the processing of step S13 is not performed, and the abovementioned header information is not added to the signal that is transmitted from the cellular phone 1 when calling is performed in step S21.

In this case, the signal that is transmitted from the cellular phone 1 is received by the exchange of the country in which the cellular phone 1 is positioned (i.e., the contracting country of the SIM card). Furthermore, the exchange of the country in which the cellular phone 1 is positioned accesses correspondent cellular phones and fixed telephones on the basis of the correspondent-station telephone numbers and country number contained in the abovementioned signal.

Next, the image that is displayed on the display 4 of the cellular phone 1 when the subroutine shown in FIG. 4 is executed will be described with reference to FIG. 5.

FIGS. 5A through 5E show examples of the images that are displayed on the display 4 of the cellular phone 1 of the present embodiment. Furthermore, in the following description, it is assumed that two SIM cards 50 (see FIG. 3), i.e., an SIM card 50 in which the own-station telephone number X is stored and an SIM card 50 in which the own-station telephone number Y is stored, are mounted in the cellular phone 1.

An antenna picture indicating the reception sensitivity for the electromagnetic waves from the base station is displayed on the upper side of the screen images shown in FIGS. 5A through 5E.

An image indicating the own-station telephone numbers respectively stored in the two SIM cards 50 is displayed in the screen image shown in FIG. 5A. When the screen image shown in this FIG. 5A is displayed, for example, a case in which the own-station telephone number X is selected is displayed; next, the screen image shown in FIG. 5B is displayed.

The screen image shown in FIG. 5B is an image that indicates the content of the telephone book data stored in the telephone number storage circuit 137; here, a plurality of images showing the names of correspondents are displayed. For example, if the name "Suzuki" is selected from these names while the screen image shown in this FIG. 5B is being displayed, since the own-station telephone number corresponding to the correspondent-station telephone number C of "Suzuki" is Y (see FIG. 3), and thus differs from the own-station telephone number X selected in FIG. 5A, the screen image shown in FIG. 5C is displayed next.

The screen image shown in FIG. 5C is the abovementioned first notification image.

An image indicating the own-station telephone number corresponding to the correspondent-station telephone number that is selected while the screen image shown in FIG. 5B is being displayed, i.e., "the number registered for this correspondent is Y", is displayed beneath the antenna picture. Furthermore, an image indicating the own-station telephone number that is selected while the screen image shown in FIG. 5A is being displayed, i.e., "the number that you have selected is X", is displayed beneath this first image. As a result, it is indicated that the selected own-station telephone number and the own-station telephone number corresponding to the correspondent-station telephone number are different. Furthermore, an image showing selection branches for the own-station telephone number that is used for calling, i.e., "call using X" and "call using Y", is displayed beneath this. Radio buttons that allow a determination to be made for the respective selection branches are displayed on the left side.

In cases where calling using the own-station telephone number X is selected while the screen image shown in FIG. 5C is being displayed, calling is performed using the own-station telephone number X which differs from the own-station telephone number Y corresponding to the correspondent-station telephone number of the correspondent "Suzuki"; accordingly, the screen image shown in FIG. 5D is displayed next.

The screen image shown in FIG. 5D is the abovementioned non-notification confirmation image.

An image prompting the input of instructions as to whether or not calling is to be performed without notification, i.e., "make call without notification?", is displayed beneath the antenna picture. Furthermore, an image showing selection branches for whether or not calling is to be performed without notification is displayed beneath this.

Meanwhile, in cases where making a call with the own-station telephone number X selected from the table displayed in the screen image shown in FIG. 5A changed to the own-station telephone number Z when (for example) the name "Yamada" is selected from the names displayed while the screen image shown in FIG. 5B is being displayed, and the screen image shown in FIG. 5C is subsequently displayed, since an SIM card 50 storing the own-station telephone number Z is not mounted in either of the engaging grooves 51, the screen image shown in FIG. 5E is subsequently displayed.

The screen image shown in FIG. 5E is the abovementioned second notification image.

An image indicating that no SIM card 50 storing the own-station telephone number Z corresponding to the correspondent-station telephone number E of the correspondent "Yamada" is mounted in either of the two engaging grooves 51, i.e, "no card storing the number Z has been inserted", is displayed beneath the antenna picture.

Furthermore, an image prompting the insertion of an SIM card 50 storing this own-station telephone number Z, i.e., "please insert card", is displayed beneath this.

In the cellular phone 1 of the present embodiment, as is described above, the own-station telephone number that is to be used can be selected by means of the cruciform direction operating key 5 or operating key group 6 when a correspondent is called; accordingly, own-station telephone numbers that are unknown to this correspondent (among a plurality of own-station telephone numbers) are not accidentally revealed to this correspondent. Accordingly, separation of use according to telephone numbers can be securely accomplished; furthermore, the mixing of communications charges and the deterioration of personal relationships can be prevented.

Furthermore, in cases where the country number of the contracting country stored in the selected SIM card 50 and the location from which the user is making a call are different, calling is performed with header information automatically added so that the exchange in this contracting country is accessed. Accordingly, there is no need to designate the country that is to be accessed or the like each time that calling is performed; consequently, this cellular phone is superior in terms of convenience.

Furthermore, in the cellular phone 1 of this embodiment, own-station telephone numbers that are ordinarily used for correspondents are stored beforehand in a telephone number storage circuit 137 so that it can automatically be determined whether or not the own-station telephone number that is selected when calling is performed is the own-station telephone number that is ordinarily used for this correspondent. Accordingly, there is no need for the user to memorize which own-station telephone numbers are being used for which correspondents, and calling in which an own-station telephone number that is not ordinarily used is accidentally used can be prevented.

Furthermore, in the cellular phone 1 of this embodiment, in cases where an SIM card storing the own-station telephone number that is ordinarily used for a correspondent is not mounted in the cellular phone 1, notification of this is provided, so that separation of the use of telephone numbers can be securely accomplished even in cases where the user has a number of SIM cards that is greater than the number of SIM cards that can be mounted in the cellular phone 1.

Furthermore, in the cellular phone 1 of this embodiment, in cases where calling is performed using an own-station telephone number that is not ordinarily used for the correspondent in question, a selection can be made as to whether or not calling is to be performed without notification. Accordingly, the accidental revelation of own-station telephone numbers that the user does not wish to reveal to correspondents can be prevented even more reliably.

In the examples described above, a case is described in which the abovementioned header information consisted of country numbers. However, in the present invention, there are no particular restrictions on the abovementioned header information, as long as this information is information that is for accessing the exchange of the contracting country of the IC card used to perform calling.

Furthermore, in the examples described above, a case is described in which the cellular phone 1 is constructed so that after it is determined that the own-station telephone number corresponding to the correspondent-station telephone number stored in the telephone number storage circuit 137 and the own-station telephone number selected at the time that calling is performed are different, and there is an input of an instruction to perform calling with the own-station telephone number altered to the own-station telephone number corresponding to the correspondent-station telephone number stored in the telephone number storage circuit 137, a determination is made as to whether or not an SIM card storing the abovementioned own-station telephone number is mounted in the cellular phone 1. In the present invention, however, it would also be possible (for example) to perform the abovementioned determination when the correspondent-station telephone number has been selected.

Furthermore, in the examples described above, a case is described in which the telephone number storage circuit 137 stored correspondent-station telephone numbers in association with one own-station telephone number. In the present invention, however, it would also be possible to devise the telephone number storage means so that correspondent-station telephone numbers can be stored in association with two or more own-station telephone numbers.

Furthermore, in the examples described above, a cases is described in which telephone book data including correspondent names, correspondent-station telephone numbers and country numbers is stored in the telephone number storage circuit 137 by an operation performed by the user. In the present invention, however, the cellular phone may also be constructed so that the above-mentioned telephone book data is stored in IC cards, and the telephone book data stored in these IC cards is stored in telephone number storage means in association with the own-station telephone numbers of these IC cards when the IC cards are mounted. In this case, the cellular phone may be constructed so that the telephone book data stored in the telephone number storage means is reset when the IC cards are removed from the cellular phone, or so that the telephone book data stored in the IC cards is added to telephone book data stored in the telephone number storage means, and is transferred and stored in a storage region of the abovementioned telephone number storage means that has been prepared in advance.

Furthermore, for example, the cellular phone may be constructed so that information stored in the IC cards is linked to information stored in the telephone number storage means at the time that the IC cards are mounted, e.g., with correspondent names, correspondent-station telephone numbers and country numbers being stored in the IC cards, correspondent names, correspondent addresses, mailing addresses and the like being stored in the telephone number storage means, and the information stored in these IC cards being stored in the telephone number storage means when the IC cards are mounted.

What is claimed is:

1. A cellular phone comprising:
    a plurality of mounting parts which allow the mounting of IC cards in which at least the country number of the contracting country and the own-station telephone number are stored;
    a position information storage device that stores position information indicating the position where said cellular phone is located;
    a selection device which makes it possible to select the IC card in which the own-station telephone number that is used for calling is stored from the IC cards mounted in each of said plurality of mounting parts;
    a first determination device which determines, on the basis of the country number stored in the IC card selected by said selection device and the position information stored in said position information storage device, whether or not calling is to be performed by adding header information for accessing the exchange of the contracting country of said IC card; and
    a calling device which performs calling by adding said header information in cases where said first determination device determines that calling is to be performed by adding said header information.

2. The cellular phone according to claim 1, comprising:
    a telephone number storage device which stores the correspondent-station telephone number and country number in correspondence with the own-station telephone number stored in one of the IC cards mounted in each of said plurality of mounting parts;
    a second determination device which determines whether or not the own-station telephone number corresponding to the correspondent-station telephone number stored in said telephone number storage device and the own-station telephone number stored in the IC card selected by said selection device are the same; and
    a first notification image display device which receives an indication that said second determination device has determined that the own-station telephone number corresponding to the correspondent-station telephone number stored in said telephone number storage device and the own-station telephone number stored in the IC card selected by said selection device are not the same, and which displays a first notification image that provides notification of a determination result.

3. The cellular phone according to claim 2, wherein telephone book data including the names of correspondents, correspondent-station telephone numbers and country numbers is stored in said telephone number storage device.

4. The cellular phone according to claim 3, which is constructed so that said telephone book data is stored in said IC cards, and said telephone book data stored in said IC cards is stored in said telephone number storage device in correspondence with the own-station telephone numbers of said IC cards when said IC cards are mounted in said cellular phone.

5. The cellular phone according to claim 4, which is constructed so that when said IC cards are removed from said cellular phone, said telephone book data stored in said telephone number storage device is reset.

6. The cellular phone according to claim 2, comprising:
    a third determination device which determines whether or not an IC card in which an own-station telephone number corresponding to the correspondent-station telephone number stored in said telephone number storage device has been mounted in one of said plurality of mounting parts; and a second notification image display device which receives an indication that said third determination device has determined that an IC card in which an own-station telephone number corresponding to the correspondent-station telephone number stored in said telephone number storage device has not been mounted in any of said plurality of mounting parts, and which displays a second notification image that provides notification of a determination result.

7. The cellular phone according to claim 2, further comprising a confirmation image display device which receives an indication that there has been the input of an instruction to perform calling using an own-station telephone number that differs from the own-station telephone number corresponding to the correspondent-station telephone number stored in said telephone number storage device, and which displays a non-notification confirmation image that allows the input of instructions as to whether or not calling is to be performed without notification.

8. The cellular phone according to claim 1, wherein said IC cards are SIM (subscriber identity module) cards.

9. A cellular phone control method, in which said cellular phone is provided with a plurality of mounting parts that allow the mounting of IC cards in which at least the country number of the contracting country and the own-station telephone number are stored, this cellular phone comprising a position information storage device that stores position information indicating the position where said cellular phone is located, and a selection device which makes it possible to select the IC card in which the own-station telephone number that is used for calling is stored from the IC cards mounted in each of said plurality of mounting parts, wherein the method comprises:

a first determination step in which a determination is made on the basis of the country number stored in the IC card selected by said selection device and the position information stored in said position information storage device as to whether or not calling is to be performed by adding header information for accessing the exchange of the contracting country of said IC card; and a calling step in which calling is performed by adding said header information in cases where it is determined in said first determination step that calling is to be performed by adding said header information.

10. The cellular phone control method according to claim 9, wherein said cellular phone comprises a telephone number storage device which stores correspondent-station telephone numbers and country numbers in correspondence with the own-station telephone number stored in one of the IC cards mounted in each of said plurality of mounting parts, and said method comprises:

a second determination step in which a determination is made as to whether or not the own-station telephone number corresponding to the correspondent-station telephone number stored in said telephone number storage device and the own-station telephone number stored in the IC card selected by said selection device are the same; and a first notification image display step in which an indication that it has been determined in said second determination step that the own-station telephone number corresponding to the correspondent-station telephone number stored in said telephone number storage device and the own-station telephone number stored in the IC card selected by said selection device are not the same is received, and a first notification image that provides notification of a determination result is displayed.

11. The cellular phone control method according to claim 10, comprising:

a third determination step in which a determination is made as to whether or not an IC card in which an own-station telephone number corresponding to the correspondent-station telephone number stored in said telephone number storage device is mounted in one of said plurality of mounting parts; and a second notification image display step in which an indication that it has been determined in said third determination step that an IC card in which an own-station telephone number corresponding to the correspondent-station telephone number stored in said telephone number storage device is not mounted in any of said plurality of mounting parts is received, and a second notification image that provides notification of a determination result is displayed.

12. A cellular phone comprising:

a plurality of mounting parts that allow the mounting of IC cards in which at least the country number of the contracting country and the own-station telephone number are stored;

position information storage means for storing position information indicating the position where said cellular phone is located;

selection means for making it possible to select the IC card in which the own-station telephone number that is used for calling is stored from the IC cards mounted in each of said plurality of mounting parts;

first determination means for determining, on the basis of the country number stored in the IC card selected by said selection means and the position information stored in said position information storage means, whether or not calling is to be performed by adding header information for accessing the exchange of the contracting country of said IC card; and calling means for performing calling by adding said header information in cases where said first determination means determine that calling is to be performed by adding said header information.

13. A cellular phone control method, in which said cellular phone is provided with a plurality of mounting parts that allow the mounting of IC cards in which at least the country number of the contracting country and the own-station telephone number are stored, this cellular phone comprising position information storage means for storing position information indicating the position where said cellular phone is located, and selection means for making it possible to select the IC card in which the own-station telephone number that is used for calling is stored from the IC cards mounted in each of said plurality of mounting parts, wherein the method comprises:

a first determination step in which a determination is made on the basis of the country number stored in the IC card selected by said selection means and the position information stored in said position information storage means as to whether or not calling is to be performed by adding header information for accessing the exchange of the contracting country of said IC card; and a calling step in which calling is performed by adding said header information in cases where it is determined in said first determination step that calling is to be performed by adding said header information.

* * * * *